US008518207B2

(12) United States Patent
Skankey et al.

(10) Patent No.: US 8,518,207 B2

(45) Date of Patent: Aug. 27, 2013

(54) WATERPROOF BREATHABLE FABRIC AND METHOD OF MAKING THE SAME

(75) Inventors: Wayne Skankey, Beaverton, OR (US); Jen Hsien Tin, Taipei (TW)

(73) Assignee: Columbia Sportswear North America, Inc., Portland, OR (US)

( * ) Notice: Subject to any disclaimer, the term of this patent is extended or adjusted under 35 U.S.C. 154(b) by 7 days.

(21) Appl. No.: 13/105,879

(22) Filed: May 11, 2011

(65) Prior Publication Data

US 2011/0281100 A1 Nov. 17, 2011

Related U.S. Application Data

(60) Provisional application No. 61/334,361, filed on May 13, 2010.

(51) Int. Cl.
*A01K 1/015* (2006.01)

(52) U.S. Cl.
USPC ............ 156/280; 118/264; 118/429; 428/221

(58) Field of Classification Search
USPC .................. 118/264, 429; 156/280; 428/221
See application file for complete search history.

(56) References Cited

U.S. PATENT DOCUMENTS

| | | | | |
|---|---|---|---|---|
| 5,283,112 | A | 2/1994 | Krishnan | |
| 6,261,678 | B1 | 7/2001 | Von Fragstein et al. | |
| 2001/0017102 | A1 | 8/2001 | Caldwell | |
| 2003/0215617 | A1* | 11/2003 | Shehata et al. | 428/196 |
| 2005/0266753 | A1* | 12/2005 | Fang et al. | 442/76 |

FOREIGN PATENT DOCUMENTS

EP 0907507 B1 12/2002

* cited by examiner

*Primary Examiner* — Michael Orlando

(74) *Attorney, Agent, or Firm* — Schwabe, Williamson & Wyatt, P.C.

(57) ABSTRACT

In various embodiments, a waterproof breathable (WPB) fabric and method of producing the same are provided wherein a WPB membrane is laminated to a first side of a fabric, the laminated fabric is then treated with a treatment agent, and the treated fabric is cured. The treatment agent may include at least one of an oleophobic (oil repellent) compound and/or a hydrophobic (water repellent) compound. In some embodiments, the hydrophobic compound may be a durable water repellent (DWR) treatment. The treatment agent may provide protection for the fabric by repelling oil-based and/or water-based substances.

16 Claims, 1 Drawing Sheet

WATERPROOF BREATHABLE FABRIC AND METHOD OF MAKING THE SAME

CROSS REFERENCE TO RELATED APPLICATIONS

The present application claims priority to U.S. Provisional Patent Application No. 61/334,361, filed May 13, 2010, entitled "Waterproof Breathable Fabric and Method of Making Same," the entire disclosure of which is hereby incorporated by reference in its entirety.

TECHNICAL FIELD

Embodiments herein relate to waterproof breathable fabrics and in particular to fabrics and methods of manufacturing waterproof breathable fabrics that generally resist contamination, which can impede fabric performance.

BACKGROUND

Currently a number of waterproof breathable (WPB) films, membranes, and materials are laminated to fabrics to create a fabric for use in outerwear that is generally both waterproof and breathable. Examples of such WPB materials include polytetrafluoroethylene (PTFE) and polyethylene (PE). Because these WPB membranes are generally oleophilic they tend to attract contaminants such as oils, detergents, etc., which in turn compromises the membrane micro-pores. The effect of this contamination tends to make the membrane more hydrophilic, which dramatically lowers the waterproofness of the fabric. In one test performed, such contamination reduced the waterproofness from 21 meters water column to less than 5 meters water column.

WPB fabric manufacturers have attempted to solve this problem by applying a film of an oleophobic material to the exposed side of the WPB membrane to prevent the aforementioned pore clogging. However in certain processes, such as those processes where a polyurethane (PU) layer is used, this effectively blocks the micro-pores rendering the WPB fabric generally non breathable and hampering the performance of the fabric. Such a film is applied prior to lamination of the WPB membrane to the fabric, which due to a disparity in melting points, also impacts the ability to effectively laminate the WPB membrane to the fabric.

To avoid this problem, companies have attempted to apply different oleophobic chemicals to the exposed WPB layer using a spray deposition technique. While this tends to avoid the problem of impeding the breathability, this material is also applied during the membrane fabrication, and thus impedes the ability to adequately laminate the membrane to the fabric, and also does not provide adequate oleophobicity.

In order to further enhance the waterproof aspect of a WPB laminated fabric, a durable water repellent (DWR) treatment is often applied to the outer surface of the fabric to further improve the water repellency and thus improve the waterproof nature of the fabric. This process is performed in a separate step after the lamination of the oleophobic chemical treated WPB membrane to the fabric.

Accordingly, in any of the above-mentioned cases, a number of steps are required to manufacture a WPB fabric, which is both time and cost intensive, which ultimately makes working with WPB fabrics expensive and challenging.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
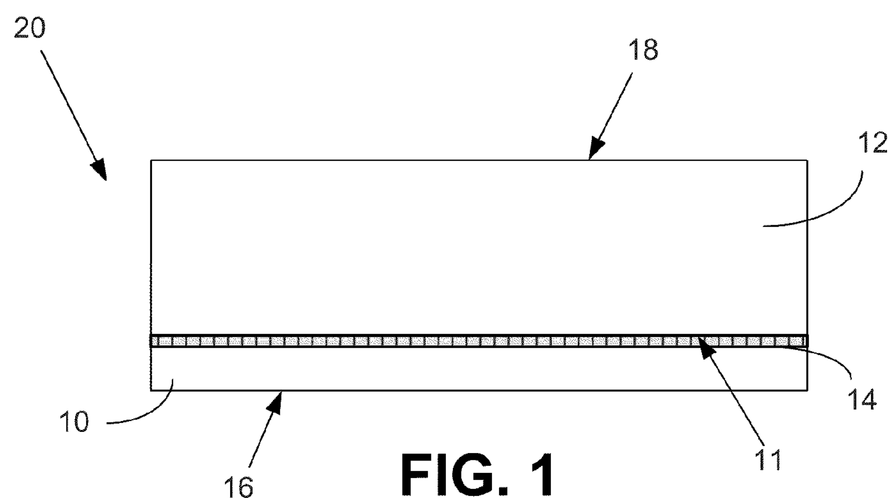
FIG. 1 illustrates a cross-sectional view of a WPB membrane laminated to a fabric in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, a waterproof breathable (WPB) fabric and method of producing the same are provided. In an example embodiment, a WPB membrane is laminated to a first side of a fabric, the laminated fabric is then treated with a treatment agent, and the treated fabric is cured.

The treatment agent may be a compound, solution, mixture, emulsion, etc. The treatment agent may include at least one of an oleophobic (oil repellent) compound and/or a hydrophobic (water repellent) compound. In some embodiments, the hydrophobic compound may be a durable water repellent (DWR) treatment. In some embodiments, the treatment agent may include both an oleophobic compound and a hydrophobic compound. The treatment agent may provide protection for the fabric by repelling oil-based and/or water-based substances. Furthermore, laminating the WPB membrane to the fabric prior to treating the fabric with the treatment agent may improve bond strength between the WPB membrane and the fabric compared with applying the treatment compound to the WPB membrane in a raw film state.

In various embodiments, the WPB membrane may be laminated to a first side of the fabric by any suitable method, including, but not limited to, a hot glue dot melt process, whereby heat and pressure are applied to induce lamination. In such embodiments, the laminated fabric may be cured at a sufficiently high temperature (such as 100 to 120 degrees Celsius) for a sufficient period of time (such as 1 to 30 minutes) to ensure that there is a strong bond between the WPB membrane and the fabric. In an embodiment, the WPB membrane may be a polyethylene (PE) membrane. In some embodiments, the first side of the fabric may be the inner side of the fabric, i.e., the side of the fabric that will face the interior of a finished garment made from the fabric. Alternatively, the first side of the fabric may be the reverse/opposite side of the fabric.

In various embodiments, once the WPB membrane is laminated to the fabric, the treatment agent may be applied to the laminated fabric. The treatment agent may be applied by any suitable applicator and process, such as passing the laminated fabric through or along a device to contact one or more pads saturated with the treatment agent and/or passing the laminated fabric through a bath containing the treatment agent. The treatment agent may be applied to an exposed side of the WPB membrane (i.e., the first side of the fabric), to a second side of the fabric opposite the first side, or to both the exposed side of the WPB membrane and the second side of the fabric. The treatment agent may also be applied to one or more edges of the fabric.

The treatment agent may be formulated to have properties of water repellency (hydrophobicity), oil repellency (oleophobicity), or both. Accordingly, the treatment agent may include at least one of a hydrophobic compound and an oleophobic compound. In some embodiments, the hydrophobic compound and oleophobic compound may be the same compound, i.e., a compound that has both hydrophobic and olephobic properties. Including both the hydrophobic compound and oleophobic compound in the same treatment agent may allow them to be applied in the same process. However, in some embodiments, a hydrophobic compound and separate oleophobic compound may be applied in separate steps.

In various embodiments, after treatment of the laminated fabric with the treatment agent, the treated fabric may be cured. The treated fabric may be actively or passively cured. In an embodiment, the treated fabric may be cured by exposing it to an elevated temperature for a period of time. In some embodiments, the treated fabric may be cured in multiple curing steps, such as by first exposing the treated fabric to a higher temperature for a shorter period of time and then exposing the treated fabric to a lower temperature for a longer period of time.

In accordance with various embodiments, FIG. 1 illustrates a cross sectional view of a WPB membrane 10 laminated to a first side 11 of a fabric 12 with a glue dot layer 14 resulting in a membrane laminated fabric 20. The first side 11 may be the inner side of fabric 12.

In various embodiments, once the WPB membrane is sufficiently laminated to the fabric, the laminated fabric 20 may be contacted with the treatment agent that is formulated to have properties of water repellency (hydrophobic), oil repellency (oleophobic), or both. The treatment agent may be disposed on an exposed side 16 of the WPB membrane 10 (i.e., on the first side 11 of fabric 12), on a second side 18 (e.g., outer surface) of fabric 12, or both.

Figure 2:
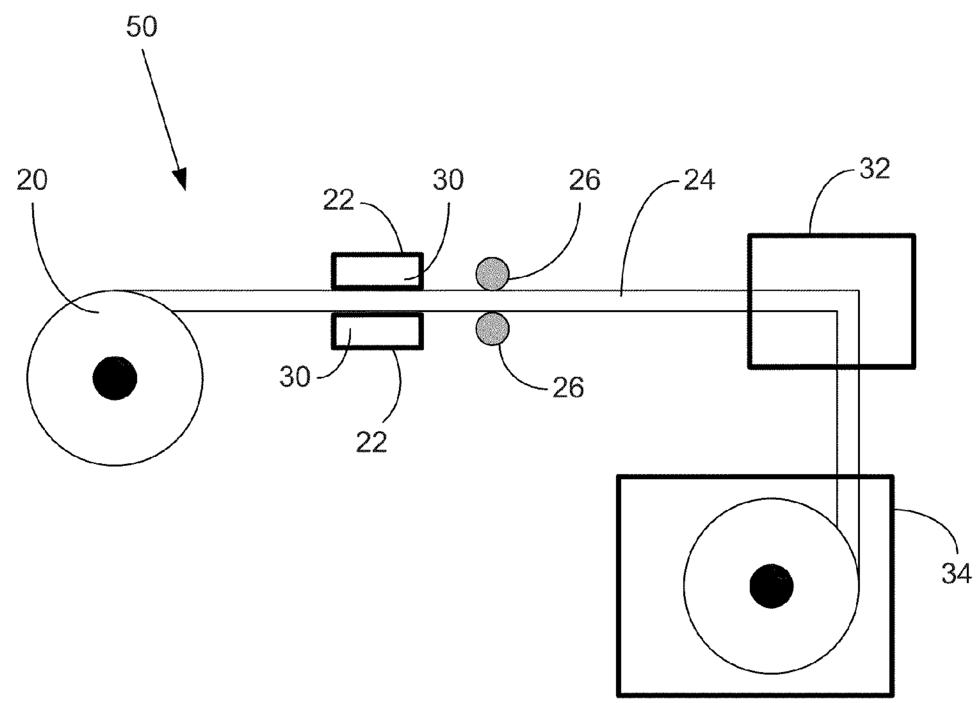
FIG. 2 illustrates a system for applying a treatment agent to a laminated fabric in accordance with various embodiments.

FIG. 2 illustrates a system 50 for treating the laminated fabric 20 with a treatment agent 30 to form a treated fabric 24, and then curing the treated fabric 24. The membrane laminated fabric 20 may be passed through one or more saturated pads 22 saturated with a treatment agent 30, whereby the treatment agent 30 is applied to one or both sides of the laminated fabric 20, resulting in a treated fabric 24. In some embodiments, treatment agent 30 may be applied by another applicator instead of, or in addition to, pads 22, such as a bath. In various embodiments, sufficient treatment agent 30 may be disposed on the laminated fabric 20 to ensure that sufficient saturation of the fabric 12 and/or the WBP membrane 10 is achieved.

The treated fabric 24 may then pass through a pair of rollers 26, such as nip rollers, that remove excess treatment agent 30 from fabric 24. Other excess compound removal devices and methods may be used including, but not limited to, blowers, gravity, and vibration. In some embodiments, removal of excess material may not be needed. Further, in various embodiments, multiple passes of the fabric through the same treatment agent or multiple different treatment agents may occur in order to ensure the desired level of treatment is achieved.

The treated fabric 24 may then pass through a first curing device 32, such as a curing oven 32, set at a designated first curing temperature to cure the treatment agent 30 to the laminated fabric 20. In various embodiments, the first curing temperature of the oven 32 may be set at a temperature that is below the melting point of PE and/or below the melting point of the particular WPB membrane that may be used, such as polytetrafluoroethylene (PTFE). In one embodiment, the first curing temperature may be set in the range of about 100 degrees Celsius to 120 degrees Celsius, and in other embodiments the first curing temperature may be set at approximately 115 degrees Celsius. Having the first curing temperature set below the melting point of the WPB membrane may help ensure that the performance characteristics of the WPB membrane are not altered or otherwise affected during the curing process. In various embodiments, the treated fabric may cure in the oven 32 for a first curing time, such as about 1 to 30 minutes, and in particular embodiments, for about 3 to 10 minutes, such as about 3 to 5 minutes.

In some embodiments, after curing in the curing oven 32, the treated fabric 24 may be transferred to a second curing device 34, such as a heated chamber/room 34, to complete the curing process. The heated room 34 may be set at a second curing temperature that is elevated from normal environmental temperature and lower than the first curing temperature, such as between about 25 degrees Celsius and 100 degrees Celsius, and in particular embodiments between about 40 degrees Celsius and 60 degrees Celsius. The treated fabric 24 may remain in the heated room 34 for a second curing time that is longer than the first curing time. The second curing time may vary depending on the laminated material and the treatment agent 30. In various embodiments, the second curing time may be about 1 to 3 days, or in some embodiments about 48 hours.

In some embodiments, the curing may be performed in a single step and held at a constant temperature for a period of time.

In various embodiments, prolonged exposure to the second curing temperature that is elevated from normal environmental temperature but below the first curing temperature may ensure that all the water and wetting agents fully evaporate and may render the laminated fabric having one or both sides thoroughly treated with an oleophobic and/or hydrophobic layer. In addition, such exposure may ensure that a durable chemical bond is achieved between the treatment agent and the WPB laminated fabric.

In embodiments, curing at high temperatures for a quick orientation of the chemical molecules and resin for durable bonding can be detrimental to the WPB film. Without being bound by theory, this may be because of the low melt temperature of the film, which may be approximately 130 degrees Celsius for PE. In various embodiments, running the fabric and film through a curing oven at a reduced temperature (for instance, so as to avoid melting the WPB film) may require a longer duration of heating time. Thus, a chemical that could be cured at 150 degrees Celsius for 2 minutes may be cured at a lower temperature for a longer period of time (for example 80 degrees Celsius for 24 hours), in accordance with various embodiments.

The treatment agent may comprise a number of components designed to help enhance the oil and water repellency of the laminated fabric. In one embodiment, the treatment agent may include a water repellent or hydrophobic fluorocarbon, an oil repellent or oleophobic fluorocarbon, a cross-linking polymer, a wetting agent, and/or water. In various embodiments, due to the hydrophobic nature of the WPB membrane, the wetting agent used may be in the concentration range of from about 5% to about 35% to help ensure sufficient penetration of the WPB membrane by the water carrying the fluorocarbons. In various embodiments, the wetting agent concentration may be approximately 20%.

In one embodiment, the treatment agent formula is as follows:

| | Concentration | |
|---|---|---|
| Component | Range | Example |
| Hydrophobic Fluorocarbon | 5%-20% | ~12% |
| Oleophobic Fluorocarbon | 5%-15% | ~10% |
| Cross linking polymer | 0%-5% | ~1% |
| Wetting Agent | 10%-30% | ~20% |
| Water | 35%-75% | ~57% |

In one embodiment, the oil repellent fluorocarbon may be, for example, AG-360, which is a fluorinated oil and grease resistant agent manufactured by AsahiGuard. The primary water repellent fluorocarbon may be a hydrophobic based fluorocarbon such as Unidyne TG-580 from Daikin Industries or other products having fluoroalkyl acrylate copolymers in concentrations greater than 5-10%. In some embodiments, such as TG-580, the hydrophobic fluorocarbon may also include an oil repellency property. In various embodiments, the cross linking polymer may include TP-10. The wetting agent may be, for example, NR-T from Baytex international.

It also has been discovered that in order to ensure sufficient penetration of the treatment agent, the pH of the treatment agent may be kept generally at or below 7. Accordingly, in various embodiments, the pH of the treatment agent may be from about 4 to about 7.

In various embodiments, the fabric may be multi-layer or single layer. In some embodiments, the fabric may include a layer that is hydrophilic, such as a tricot backer. In these embodiments, the treatment agent may be applied after the hydrophilic layer is applied to the fabric in order to protect the fabric from oil contamination.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of manufacturing a waterproof breathable fabric comprising:

laminating a waterproof breathable membrane to a first side of a fabric to form a laminated fabric, leaving an exposed side of the waterproof breathable membrane;

applying a treatment agent to the laminated fabric to form a treated fabric, the treatment agent including:

a hydrophobic compound with a concentration in the range of 5% to 20;

an olephobic compound with a concentration in the range of 5% to 15%;

a wetting agent with a concentration in the range of 10% to 30%; and water in the range of 35% to 75%; and curing the treated fabric.

2. The method of claim 1 wherein the treatment agent further includes a cross linking polymer.

3. The method of claim 1 wherein the treatment agent is applied to the exposed side of the waterproof breathable membrane.

4. The method of claim 1 wherein the treatment agent is applied to a second side of the laminated fabric, opposite the first side.

5. The method of claim 4 wherein the treatment agent is applied to both the exposed side of the waterproof breathable membrane and the second side of the laminated fabric.

6. The method of claim 1 wherein the curing comprises subjecting the treated fabric to a curing temperature for a curing time, the curing temperature being lower than a melting temperature of the waterproof breathable membrane.

7. The method of claim 6 wherein the curing temperature is in the range of 100 degrees Celsius to 120 degrees Celsius and the curing time is in the range of one to thirty minutes.

8. The method of claim 6 wherein the curing temperature is in the range of forty degrees Celsius to sixty degrees Celsius and the curing time is in the range of one to three days.

9. The method of claim 1 wherein the curing comprises placing the treated fabric in a first curing device to expose the treated fabric to a first curing temperature for a first curing time; and placing the treated fabric in a second curing device, after the placing in the first curing device, to expose the treated fabric to a second curing temperature for a second curing time, the second curing temperature being lower than the first curing temperature and the second curing time being longer than the first curing time.

10. The method of claim 1 wherein the treatment agent has a pH between 4 and 7.

11. The method of claim 1 wherein the applying comprises passing the laminated fabric through one or more pads saturated with the treatment agent.

12. The method of claim 1 further comprising passing the treated fabric through one or more removal devices to remove excess treatment agent prior to curing the treated fabric.

13. The method of claim 12 wherein the one or more removal devices comprise one or more rollers.

14. The method of claim 2, wherein the cross linking polymer has a concentration of 5% or less.

15. A method of manufacturing a waterproof breathable fabric comprising:

laminating a waterproof breathable membrane to a first side of a fabric to form a laminated fabric, leaving an exposed side of the waterproof breathable membrane;

applying a treatment agent to the laminated fabric to form a treated fabric, wherein the treatment agent includes:

a hydrophobic fluorocarbon having a concentration in the range of 5% to 20%, an oleophobic fluorocarbon having a concentration in the range of 5% to 15%, a wetting agent having a concentration in the range of 10% to 30%, and water having a concentration in the range of 35% to 75%; and curing the treated fabric.

16. The method of claim 15, wherein the treatment agent further includes a cross linking polymer with a concentration of 5% or less.

* * * * *